United States Patent
Ruiz et al.

(10) Patent No.: US 11,613,292 B2
(45) Date of Patent: *Mar. 28, 2023

(54) SLIDE COOLER

(71) Applicants: Ricardo Ruiz, Dallas, GA (US); Mark Randall Pettett, Marietta, GA (US)

(72) Inventors: Ricardo Ruiz, Dallas, GA (US); Mark Randall Pettett, Marietta, GA (US)

(*) Notice: Subject to any disclaimer, the term of this patent is extended or adjusted under 35 U.S.C. 154(b) by 361 days.

This patent is subject to a terminal disclaimer.

(21) Appl. No.: 16/906,550

(22) Filed: Jun. 19, 2020

(65) Prior Publication Data

US 2020/0317248 A1  Oct. 8, 2020

Related U.S. Application Data

(63) Continuation of application No. 15/730,391, filed on Oct. 11, 2017, now Pat. No. 10,696,318.

(60) Provisional application No. 62/406,507, filed on Oct. 11, 2016.

(51) Int. Cl.
| | |
|---|---|
| *B62B 13/18* | (2006.01) |
| *B62B 13/06* | (2006.01) |
| *B62B 1/18* | (2006.01) |

(52) U.S. Cl.
CPC ............... *B62B 13/18* (2013.01); *B62B 1/18* (2013.01); *B62B 13/06* (2013.01); *B62B 2202/52* (2013.01); *B62B 2204/06* (2013.01)

(58) Field of Classification Search
CPC .......... B62B 13/18; B62B 1/18; B62B 13/06; B62B 2202/52; B62B 2204/06
See application file for complete search history.

(56) References Cited

U.S. PATENT DOCUMENTS

| | | | |
|---|---|---|---|
| 3,511,517 A * | 5/1970 | Hill | ............... B62B 13/08 |
| | | | 280/16 |
| 2005/0274726 A1 | 12/2005 | Boggs et al. | |
| 2011/0226003 A1 | 9/2011 | Chaney et al. | |
| 2013/0249176 A1 | 9/2013 | Bengtzen | |

FOREIGN PATENT DOCUMENTS

| | | | | |
|---|---|---|---|---|
| GB | 2328182 A * | 2/1999 | ............ | B62B 1/18 |
| WO | WO-9712797 A2 * | 4/1997 | ............ | B60B 37/10 |

* cited by examiner

*Primary Examiner* — Larry L Furdge
(74) *Attorney, Agent, or Firm* — Dickinson Wright PLLC

(57) ABSTRACT

A mobile container that is designed to allows a user to easily transport the container through a variety of terrains, such as snow, sand, and pavement. The mobile container includes an insulated container, a first sled-molded runner, a second sled-molded runner, a first wheel, a second wheel, and a convex protrusion. The first sled-molded runner and the second sled-molded runner are positioned parallel and opposite to each other, across the insulated container, and are adjacently connected to a base of the insulated container. The first wheel and the second wheel are laterally and coaxially connected to the insulated container, opposite to each other. The convex protrusion modifies the flow of sand or snow about the insulated container in order to decrease drag. The convex protrusion is positioned opposite the first wheel and the second wheel. Additionally, the convex protrusion is integrated into a front surface of the insulated container.

17 Claims, 6 Drawing Sheets

SLIDE COOLER

This application is a continuation of U.S. patent application Ser. No. 15/730,391, filed Oct. 11, 2017, which claims priority to and the benefit of U.S. Pat. App. No. 62/406,507, filed Oct. 11, 2016. The contents of the above-referenced applications are hereby incorporated by reference in their entirety.

FIELD OF THE INVENTION

The present invention relates generally to portable beverage and food cooler.

More specifically, the present invention is a cooler container equipped with a multitude of mobility features. The present invention includes a pair of wheels, a pair of ski-like runners, and a dynamic bottom. These features allow the present invention to be easily pulled across sand, snow, pavement, and other various types of terrains.

BACKGROUND OF THE INVENTION

Although coolers are extremely useful for storing food while away from electrical power sources, they are frequently unwieldy to transport over rough terrain, sand or snow. Frequently beach coolers are equipped with wheels that facilitate rolling the cooler over hard surfaces. However, these wheels no longer function when transporting the cooler over sand or even snow. The present invention addresses this issue by having an all in one cooler design without body attachments, with a ski-like molding on the bottom sides of the cooler and a boat bottom convex type under molding or shape. This body design enables the cooler to slide over sand or snow surfaces. In addition, the present invention is equipped with typical wheels which function the same as the wheels of a traditional beach cooler. As a result, the present invention can be easily transported from a hard surface to sand or snow terrain without assistance. The wheels due to their elevated setting become disengaged from the ground when in transit over the sand or snow. Traditionally, beach coolers must be carried or even worse and more common, drug from the boardwalk to the water's edge or destination because the wheels do not function in the sand. The typical cooler is also shaped in a rectangular manner along with square top 7 and bottom square edges. The user, due to the weight and square design of the cooler if alone must attempt to drag through the sand. The square bottom front creates a trench and an unnecessary opposition. The wheels typically become buried in the sand and are completely nonfunctional for transit. The present invention enables users to slide their cooler behind them from the boardwalk to their chosen spot on the beach without any struggles or added contraptions because of its design; it's an all in one cooler for the beach terrain.

DETAIL DESCRIPTIONS OF THE INVENTION

All illustrations of the drawings are for the purpose of describing selected versions of the present invention and are not intended to limit the scope of the present invention.

The present invention generally relates to storage containers. More specifically, the present invention is a cooler container designed to easily slide and or roll on a variety of surfaces including, but not limited to, sand, snow, pavement, and other similar terrains. The present invention utilizes a boat-like bottom in order displace and distribute terrain particles efficiently and effectively, thus allowing the present invention to be slid across sand or snow with ease.

Figure 1:
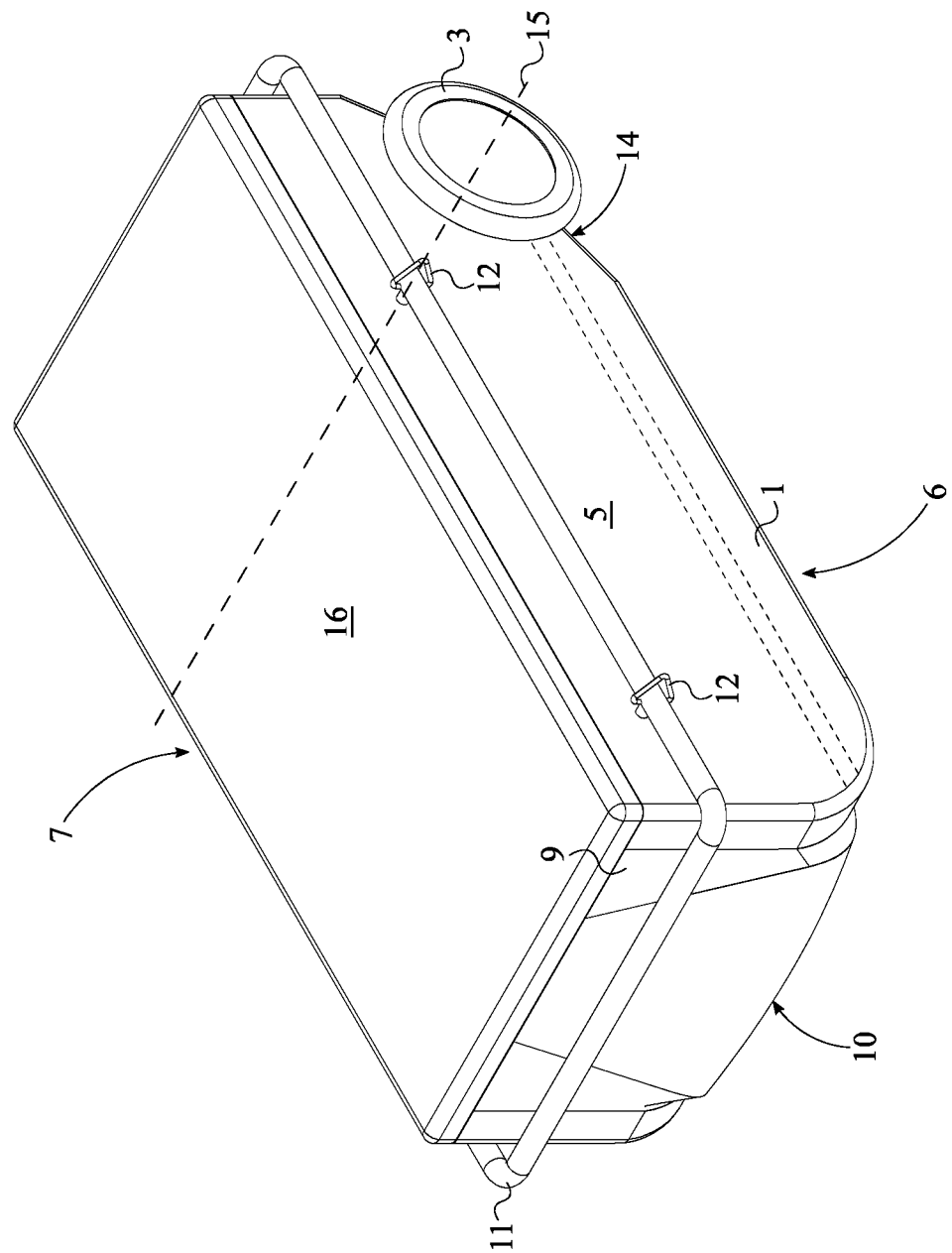
FIG. 1 is a perspective view of the present invention.
Figure 2:
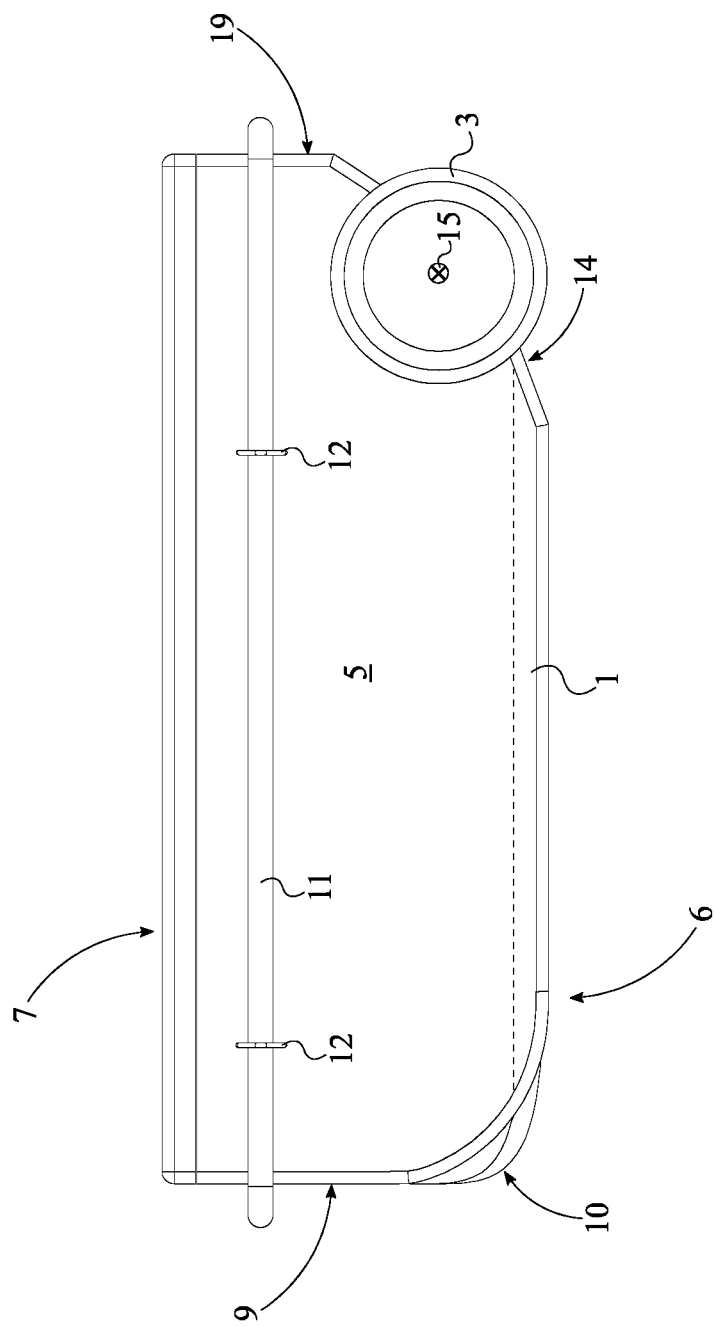
FIG. 2 is a right-side view of the present invention.
Figure 3:
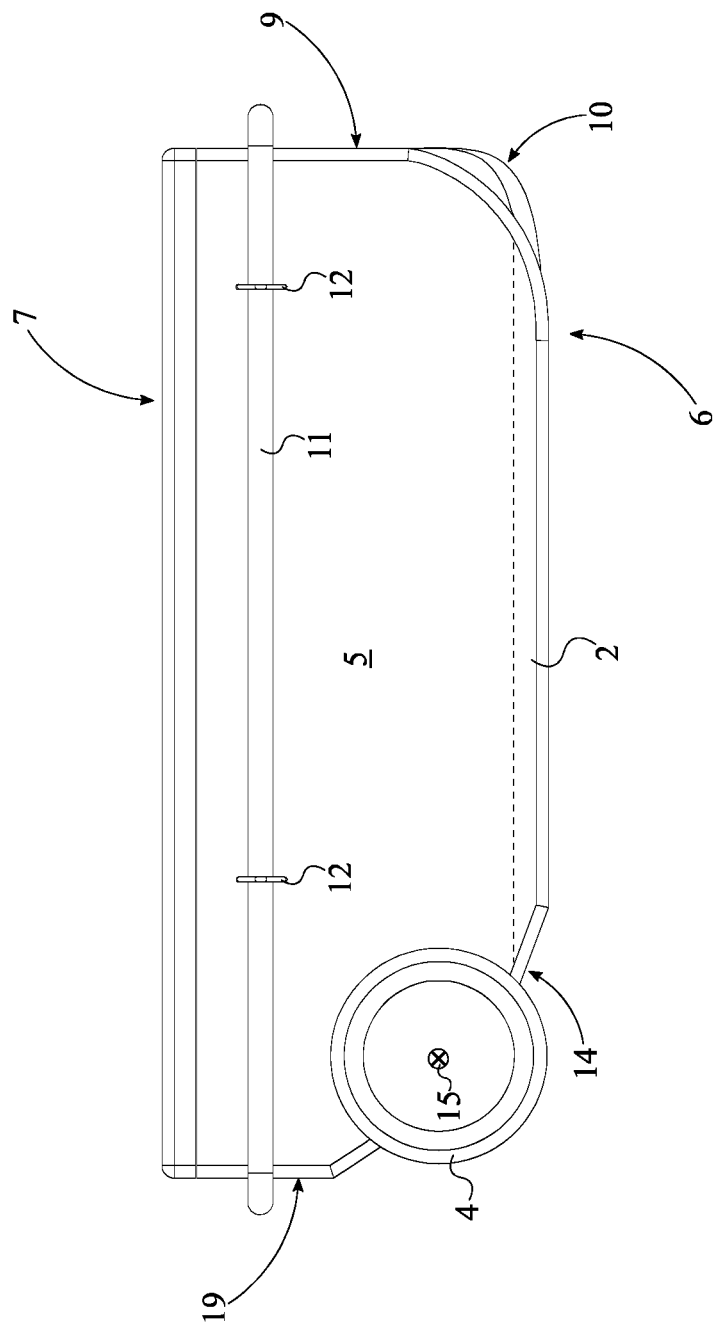
FIG. 3 is a left-side view of the present invention.
Figure 4:
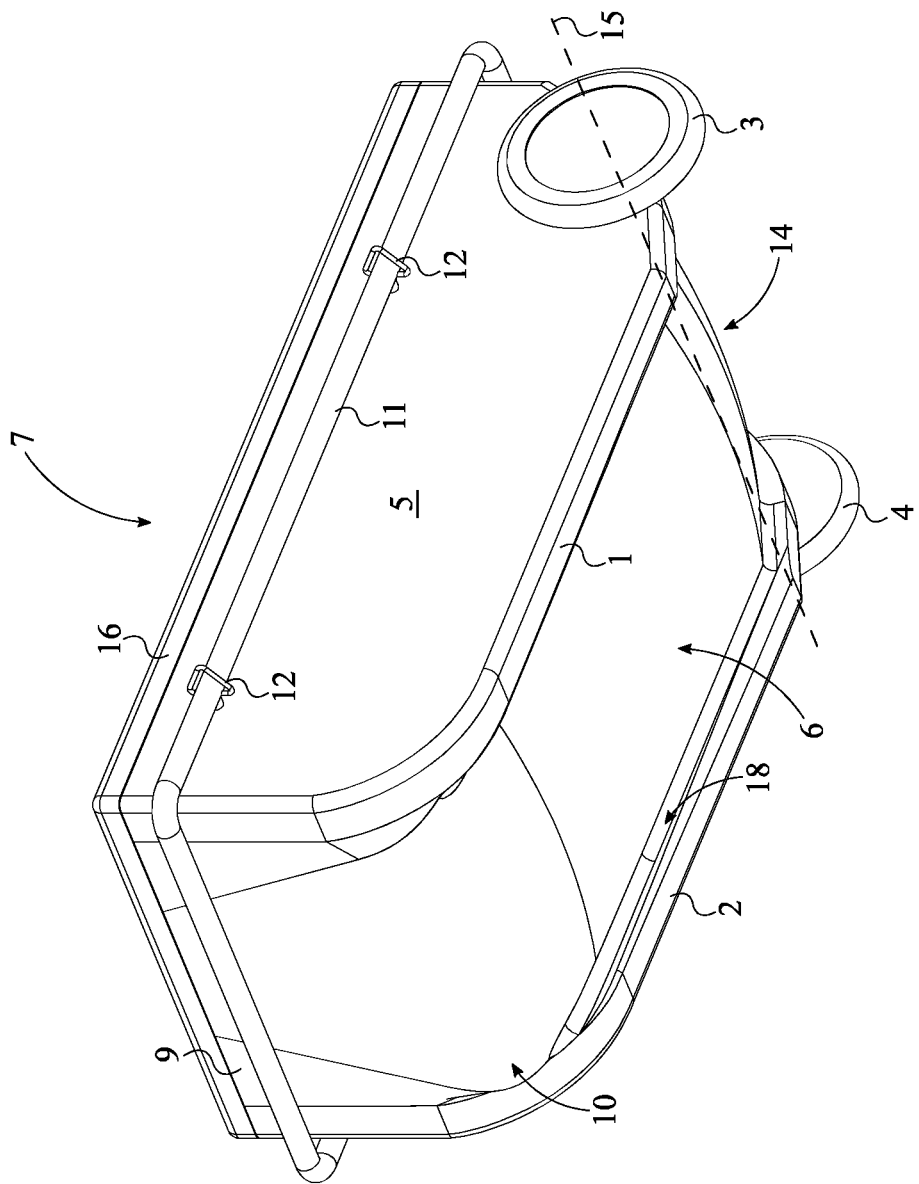
FIG. 4 is a bottom perspective view of the present invention.

Referring to FIG. 1 and FIG. 4, in its simplest embodiment, the present invention comprises an insulated container 5, a first sled-molded runner 1, a second sled-molded runner 2, a first wheel 3, a second wheel 4, an at least one lid 16, and a convex protrusion 10. The insulated container 5 is a thermally insulated receptacle designed to store and transport food items. The insulated container 5 includes an interior cavity and ensures stored items are kept at a specific temperature, regardless of the external temperatures. The insulated container 5 is preferably an elongated hollow box composed of thermally insulating material. The insulated container 5 may be implemented in a variety of sizes in order to meet the needs and preferences of the user. Additionally, the present invention may further comprise a plurality of dividers. The plurality of dividers is distributed within the interior cavity and each of the plurality of dividers is integrated into the insulated container 5. The plurality of dividers split the interior cavity into a multitude of subdivisions for additional organizational purposes. Furthermore, referring to FIG. 2 and FIG. 3, the insulated container 5 is dynamically designed in order to facilitate the present invention sliding on sand or snow. A front junction between a base 6 of the insulated container 5 and a front surface 9 of the insulated container 5 is filleted, or rounded in other words. Traditionally, the front junction is a straight corner that presses into the terrain and prevents movement. The present invention eliminates this obstruction through a boat-like hull design.

Referring to FIG. 3 and FIG. 4, the first sled-molded runner 1 and the second sled-molded runner 2 are each a ski-like member designed to allow the present invention to easily slide over sand or snow. More specifically, the first sled-molded runner 1 and the second sled-molded runner 2 are each a flat and elongated support member of a length equal to or less than the length of the insulated container 5. The first sled-molded runner 1 and the second sled-molded runner 2 are positioned opposite and parallel to each other, similar to a snow sled. The first sled-molded runner 1 and the second sled-molded runner 2 are adjacently connected to a base 6 of the insulated base 6 to act as the interface elements for the surface on which the present invention is placed. Additionally, the first sled-molded runner 1 and the second sled-molded runner 2 act as support legs for the present invention. Resultantly, the base 6 of the insulated container 5 is raised off the ground by the first sled-molded runner 1 and the second sled-molded runner 2, thus reducing the amount of surface area in contact with the ground. In the preferred embodiment, the first sled-molded runner 1, the second sled-molded runner 2, and the insulated container 5 are manufactured as a single component. This allows for a first junction 17 between the first sled-molded runner 1 and the base 6 to be filleted, or rounded. Similarly, this process allows a second junction 18 between the second sled-molded runner 2 and the base 6 to be filleted, or rounded. The first junction 17 and the second junction 18 reduce stress points and sharp corners, thus reducing overall drag for the present invention. To further ensure there is as little resistance as possible when the present invention is being pulled through sand or snow, the first sled-molded runner 1 and the second sled-molded runner 2 are each rounded with front surface 9, similar to the front junction.

Figure 5:
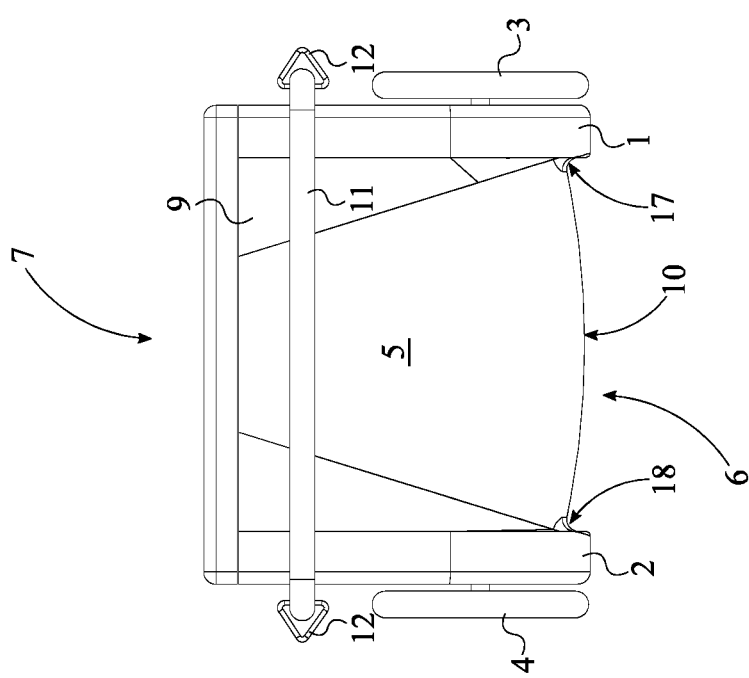
FIG. 5 is a front view of the present invention.

Referring to FIG. 4 and FIG. 5, the convex protrusion 10 is a bulge-like extrusion which allows the present invention to slide on sand or snow relatively unhindered. The convex protrusion 10 is preferably a convex hull boat shape. The convex protrusion 10 is positioned in between the first sled-molded runner 1 and the second sled-molded runner 2. Additionally, the convex protrusion 10 is integrated into the insulated container 5. The convex protrusion 10, the front junction, the first sled-molded runner 1, and the second sled-molded runner 2 modify the flow of the present invention through sand or snow. Resultantly, the present invention can easily slide along sand, snow, and other similar terrains. In the preferred embodiment, the convex protrusion 10 is integrated into the front surface 9, adjacent to the front junction. Additionally, the convex protrusion 10 tapers from the base 6 towards a top 7 of the insulated container 5.

The first wheel 3 and the second wheel 4 allow the present invention to roll on level ground, such as pavement. The first wheel 3 and the second wheel 4 are positioned opposite to the convex protrusion 10, about the insulated container 5. Similar to traditional designs, the first wheel 3 and the second wheel 4 are coaxially positioned opposite to each other across the insulated container 5. Additionally, the first wheel 3 and the second wheel 4 are laterally and rotatably mounted to the insulated container 5. In particular, the first wheel 3 is positioned to the first sled-molded runner 1 and the second wheel 4 is positioned adjacent to the second sled-molded runner 2. The first wheel 3 and the second wheel 4 are preferably positioned offset to the base 6 in order to not touch the ground unless the user tilts the insulated container 5. This ensures that the first wheel 3 and the second wheel 4 are only used on pavement and other straight surfaces and do not produce additional drag when the present invention is transported over sand or snow.

The insulated container 5 is designed to ensure that when the insulated container 5 is tilted, that the first wheel 3 and the second wheel 4 make contact with the ground and are able to rotate. This is achieved through a transition portion 14 in between the base 6 and a rear surface 19. The transition portion 14 is the region of the insulated container 5 between the base 6 and the rear surface 19 that is preferably convex in curvature, thus creating an overall tapering profile. A shared rotation axis 15 between the first wheel 3 and the second wheel 4 is positioned adjacent to the transition portion 14 with the shared rotation axis 15 being positioned offset to the base 6. This position ensures the first wheel 3 and the second wheel 4 are marginally offset from the base 6 while the present invention is being slid across terrain. When the present invention is tilted, the transition portion 14 provides the first wheel 3 and the second wheel 4 clearance to contact the ground and rotate. Overall, when the insulated container 5 is viewed from the side, the insulated container 5 tapers from the center towards the front surface 9 and the rear surface 19.

Figure 6:
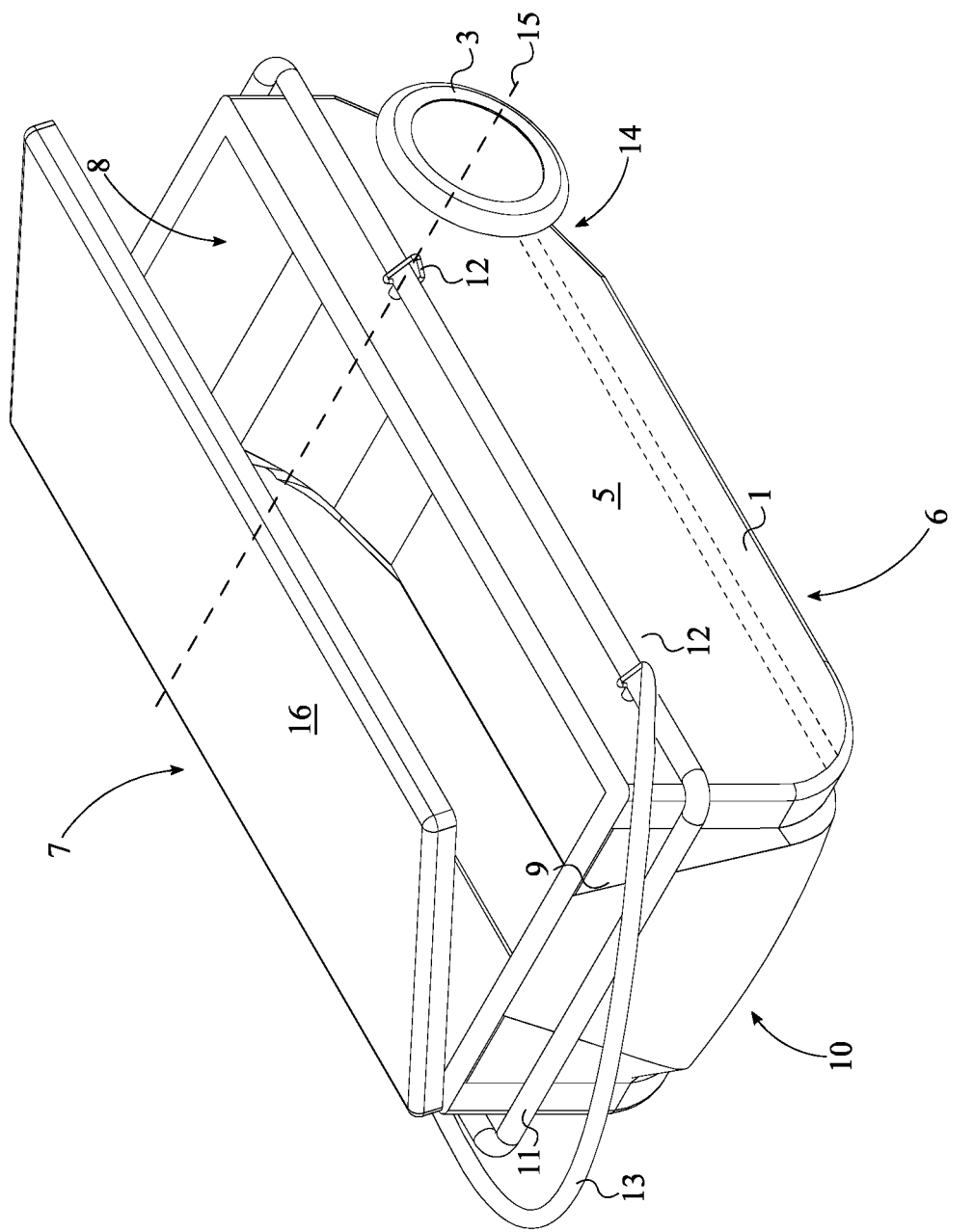
FIG. 6 is perspective view of the present invention with the lid being partially opened.

Referring to FIG. 6, the at least one lid 16 encloses the interior cavity and seals the insulated container 5. As a result, the internal temperature of the interior cavity maintains a constant level. The lid 16 is perimetrically positioned adjacent to a main opening 8 of the insulated container 5 and is hingedly attached to the insulated container 5. Similar to the insulated container 5, the lid 16 is composed of thermally insulating material and is sized complimentary to the main opening 8. A plurality of locking fasteners may be integrated in between the lid 16 and the insulated container 5 in order to lock the lid 16 to the insulated container 5. Additionally, an interior seal may be integrated in between the lid 16 and the insulating container in order act as a gasket and prevent air from entering or exiting the interior cavity. In an alternative embodiment of the present invention, the at least one lid 16 comprises a plurality of sections, wherein the plurality of sections is distributed along the insulated container 5.

In one embodiment, the present invention further comprises a railing 11, a plurality of hooks 12, and a detachable strap 13. The railing 11 is an elongated cylinder that is used as a grasping element for the present invention. The railing 11 is positioned in between the base 6 and a top 7 of the insulated container 5. Additionally, the railing 11 is laterally connected about the insulated container 5. In particular, the railing 11 laterally circumvents the insulated container 5 in order to provide the user with a grasping element from all lateral sidewalls of the insulated container 5. Furthermore, the railing 11 is positioned adjacent to the top 7 of the insulated container 5 for easier access for the user. The plurality of hooks 12 and the detachable strap 13 allow the user to easily transport and pull the present invention. The plurality of hooks 12 is distributed along the railing 11 with each of the plurality of hooks 12 being laterally mounted to the railing 11. Additionally, each of the plurality of hooks 12 is positioned adjacent to the railing 11, opposite the insulated container 5. The detachable strap 13 is an elastic tether or an elongated cord that allows a user to pull the present invention. Additionally, the detachable strap 13 allows various items to be tethered to the present invention. Referring to FIG. 6, the detachable strap 13 is tethered to an at least one selected hook from the plurality of hooks 12. The detachable strap 13 may be used for variety of uses. For example, in one embodiment of the present invention, the detachable strap 13 may be attached to a harness such that the user may utilize his or her full body weight to pull the present invention. In another embodiment, the detachable strap 13 may be used to tie done various items to the lid 16.

Although the invention has been explained in relation to its preferred embodiment, it is to be understood that many other possible modifications and variations can be made without departing from the spirit and scope of the invention as hereinafter claimed.

The invention claimed is:
1. A cooler, comprising:
an insulated container having wheels mounted to the insulated container and a base;
the cooler has a rest configuration wherein a bottom of the insulated container is configured to abut an underlying support surface such that the wheels do not touch the underlying support surface;
the cooler has a tilt configuration wherein the insulated container is configured to be diagonal relative to the underlying support surface such that the wheels contact the underlying support surface; and
junctions formed in the base and extending along sides the base, and each junction comprises an arcuate concave shape.
2. The cooler of claim 1, wherein the wheels are located at a rear of the insulated container.
3. The cooler of claim 1, wherein the insulated container comprises a bottom with sled runners extending in longitudinal directions along lateral sides thereof.

4. The cooler of claim 1, wherein the insulated container comprises a front with a convex protrusion and a rear with a transition portion.

5. The cooler of claim 1, wherein each junction extends along a length of a respective sled runner and into a transition portion of the insulated container.

6. The cooler of claim 1, wherein a portion of the insulated container comprises is a boat hull shape.

7. The cooler of claim 1, wherein a portion of the bottom of the insulated container is entirely convex between the junctions.

8. The cooler of claim 1, wherein a portion of the insulated container is convex toward a forward direction of the cooler and toward a bottom direction of the cooler, such that the insulated container tapers from a center thereof toward both a front surface and a rear surface thereof.

9. A cooler, comprising:
    an insulated container having a bottom with sled runners extending in longitudinal directions along lateral sides thereof, a front with a convex protrusion and a rear with a transition portion;
    wheels and mounted to the insulated container in the transition portion;
    the cooler has a rest configuration wherein a bottom of the insulated container is configured to abut an underlying support surface such that the wheels do not touch the underlying support surface; and
    the cooler has a tilt configuration wherein the insulated container is configured to be diagonal relative to the underlying support surface such that the wheels contact the underlying support surface; and
    junctions extending directly between respective ones of the sled runners and the base, each junction comprises an arcuate concave shape that extends along a length of a respective sled runner and into the transition portion, and a portion of the bottom of the insulated container is entirely convex between the junctions.

10. The cooler of claim 9, wherein the convex protrusion is a boat hull shape that is entirely convex from the first junction to the second junction.

11. The cooler of claim 9, wherein the convex protrusion is convex toward a forward direction of the cooler and toward a bottom direction of the cooler, such that the insulated container tapers from a center thereof both toward the front surface and a rear surface thereof.

12. The cooler of claim 9, a railing coupled to the insulated container.

13. The cooler of claim 9, wherein the railing forms a continuous grasping element for all lateral sidewalls of the insulated container.

14. The cooler of claim 9, wherein the transition portion is both convex and inclined diagonally.

15. The cooler of claim 9, further comprising a flexible member tethered to the insulated container for manual manipulation of the cooler.

16. The cooler of claim 15, wherein the flexible member is tethered to a railing of the insulated container.

17. The cooler of claim 9, further comprising a rail mounted to the insulated container to form a manual grasping element on all lateral sidewalls of the insulated container.

* * * * *